United States Patent Office 3,430,792
Patented Mar. 4, 1969

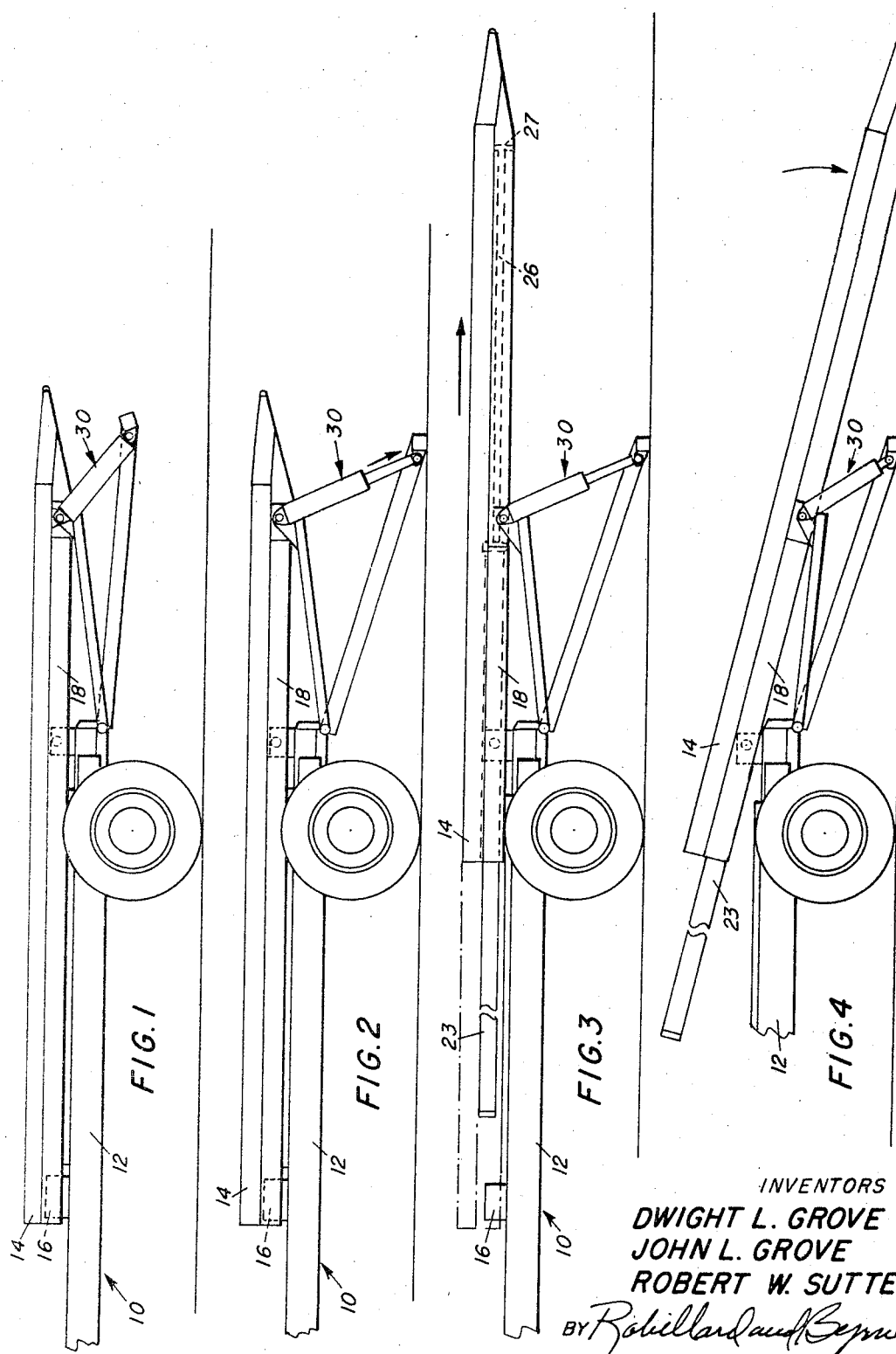

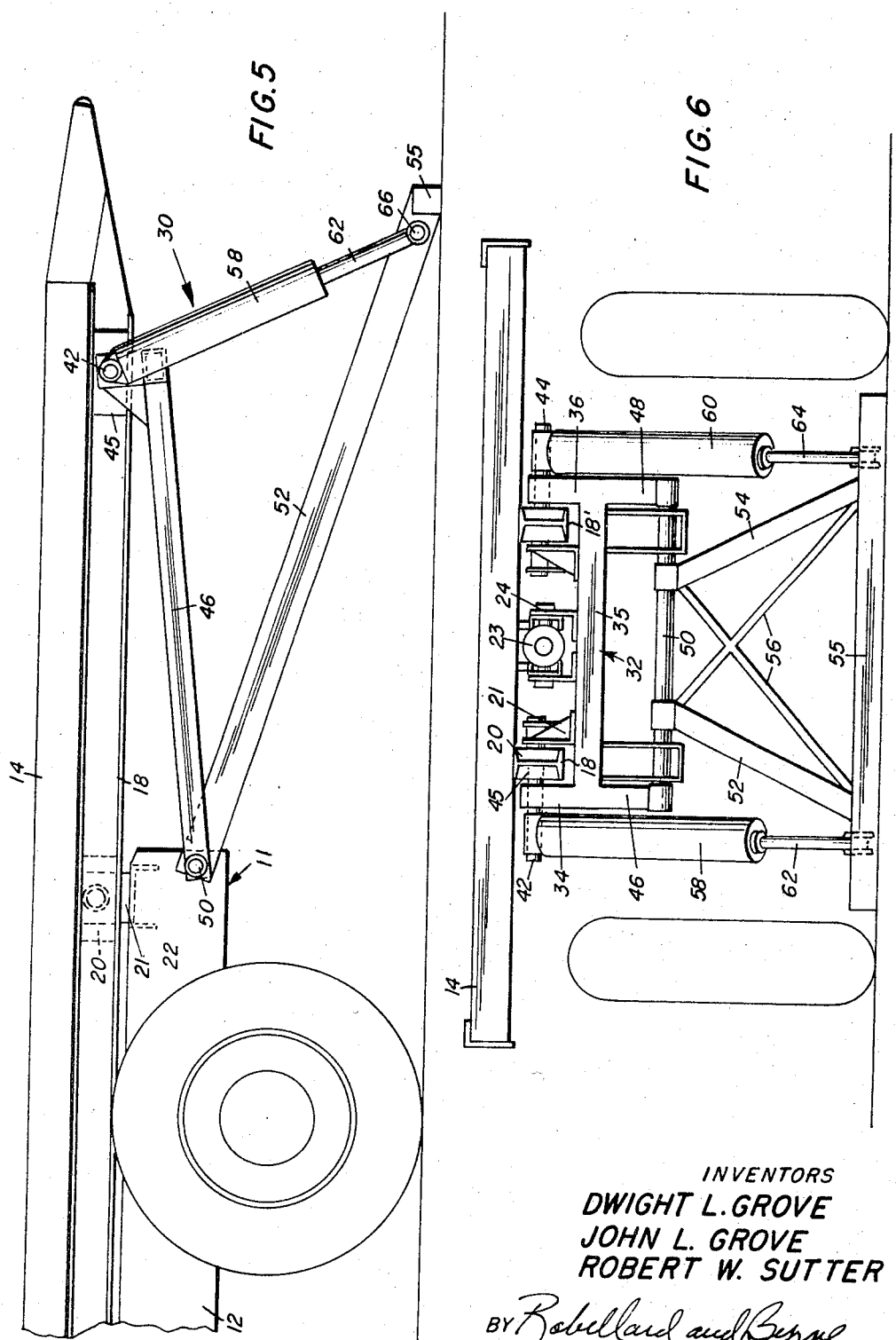

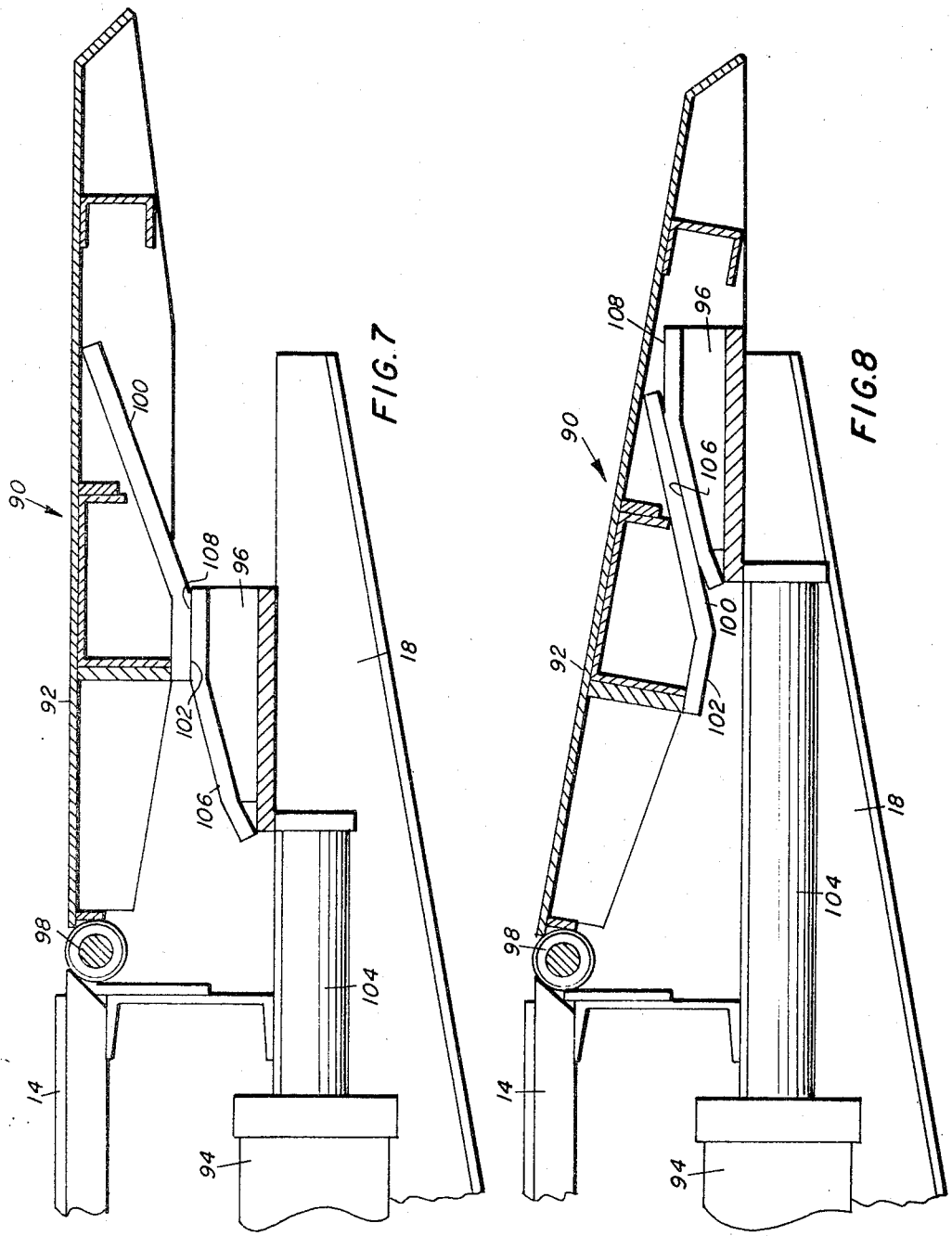

3,430,792
VEHICLE WITH TILTING BED
Dwight L. Grove and John L. Grove, Greencastle, and Robert W. Sutter, Waynesboro, Pa., assignors, by mesne assignments, to Grove Manufacturing Company, Shady Grove, Pa., a corporation of Pennsylvania, and a wholly owned subsidiary of Walter Kidde & Company, Inc.
Filed July 12, 1967, Ser. No. 652,862
U.S. Cl. 214—505          14 Claims
Int. Cl. B60p 1/04, 1/30; B65g 67/32

ABSTRACT OF THE DISCLOSURE

A vehicle of a type having a bed slidably and pivotably secured on a pivot at the rear of the vehicle frame. The apparatus for tilting the bed has one end connected to said frame below said pivot and includes a pair of hydrauilc jacks having first ends in sliding engagement with said bed and second ground-engaging ends.

---

This invention relates to apparatus for tilting the bed of a vehicle into a ground-engaging position and more particularly relates to apparatus with the capability of supporting and tilting the bed into a desirable loading angle when the vehicle is operating in uneven terrain.

In conventional constructions, self-loading vehicles have accomplished bed tilting by providing hydraulic cylinders and/or lever arms operable between the bed and the vehicle frame between the front and rear axles of the vehicle. This type of connection results in a bed loading angle which is determined by the ground elevation at the point the bed contacts the ground. In other words, once the vehicle is positioned, the bed loading angle is fixed and the bed cannot be conveniently adjusted to contact ground points of higher and lower elevations. This limitation is particularly undesirable when the ground rearwardly of the vehicle is lower than the truck, thus causing a relatively steep loading angle. It is a primary objective of this invention, therefore, to provide a vehicle having a sliding, tilting bed which bed can be adjusted to provide different loading angles from the same vehicle position.

Another objective of this invention is to provide means for suporting and tilting the bed of the vehicle in such a manner that uneven stresses to which the bed is subjected will be transmitted to the vehicle frame through the main spring suspension.

A still further objective of the invention is to provide a supporting structure for a vehicle bed which permits the bed to slide longitudinally with respect to the main vehicle frame and means to tilt the rear of the bed into ground engagement at selected positions of the bed with respect to said frame.

Another important objective of the invention is to provide in a vehicle-tilting bed combination an adjustable support intermediate the length of the bed when it is tilted into its ground-engaging position.

Another important objective of the invention is to provide an adjustable approach plate on the ground-engaging end of a tiltable vehicle bed in order to increase the loading capability of the vehicle.

These and other objects of the invention will become more apparent to those skilled in the art by reference to the following description when viewed in light of the accompanying drawings, wherein:

FIGURE 1 is a side elevation of the rear portion of a vehicle showing the vehicle bed and tilting apparatus in their travel positions;

FIGURE 2 is a side elevation of the vehicle portion shown in FIGURE 1 with the tilting apparatus in the extended position;

FIGURE 3 is a side elevation of the vehicle portion shown in FIGURE 1 with the vehicle bed extended rearwardly and the tilting assembly in its extended position;

FIGURE 4 is a side elevation of the vehicle portion showing the vehicle bed in a loading position;

FIGURE 5 is a more detailed side elevation of the tilting assembly with portions broken away;

FIGURE 6 is an end view of the structure shown in FIGURE 5;

FIGURE 7 is a side elevation of the approach plate assembly in its nonpivoted position; and FIGURE 8 is a side elevation of the approach plate assembly in a pivoted position.

Referring now to the drawings wherein like numerals indicate like elements, the numeral 10 indicates the rear of a vehicle having a main frame 11 and a bed or platform 14. The main vehicle frame consists principally of a pair of box beams 12 and 12' running the longitudinal length of the vehicle. As is conventional in vehicles of this type, the framework is connected to the axle assemblies by heavy duty leaf springs.

The bed as shown in FIGURE 1 is in its forward travel position and is locked against the frame 11 by a lockdown device 16. A locking device suitable for these purposes is described in detail in assignee's copending application Ser. No. 621,216, filed Mar. 7, 1967.

The framework of bed 14 includes a pair of longitudinal I-beams 18 and 18'. First and second slide blocks 20 are pivotally mounted on brackets 21 which are rigidly mounted on a cross-beam 22, which cross-beam is secured between the ends of beams 12 and 12'. The slide blocks 20 engage the inner upper flanges of the beams 18 and 18' in the usual manner to slidably receive the beams 18 and thereby pivotally support the bed with respect to the frame 11. The bed is movable longitudinally of the frame by a double-acting, hydraulic cylinder 23. Intermediate its cylinder length the cylinder 23 is pivotally mounted on the cross-beam 22 by a bracket 24. The bracket 24 is affixed to the main frame on the cross-beam 22 midway between the slide blocks 20. The hydraulic cylinder 23 has a rearwardly extending piston rod 26 which is rigidly connected to the rear of bed 14 at connector 27 (FIGURE 3).

A jack assembly 30 is pivotally carried at the rear of frame 11 and is also in sliding engagement with bed 14. This jack assembly provides the tilting mechanism for the bed 14. The assembly includes a U-shaped trunnion member 32 (FIGURE 6) having a pair of vertical legs 34 and 36 at either end of a trunnion base 35. Leg 34 carries a stub shaft 42 and leg 36 carries a stub shaft 44. The shafts 42 and 44 each pivotally carry slide blocks 45 for slidably engaging the outer upper flanges of I-beams 18 and 18' in a similar manner as slide blocks 20. Therefore, at this time it can be seen that the bed 14 is slidably engaged by first and second longitudinally spaced slide blocks 20 and 45. The first slide blocks 20 are carried by the vehicle frame and the second slide blocks 45 by the jacking apparatus.

The jacking assembly further includes a pair of arms 46 and 48 having their first ends fixedly secured to the lower end of the trunnion base 35 and their second ends extending forwardly (FIGURE 5) and secured to a shaft 50. The arms 46 and 48 can be interconnected by braces to form a framework for maintaining the slide blocks 45 of the jacking assembly in place as the bed 14 slides therepast. The shaft 50 is supported by and extends transversely between the main frame members 12 and 12'. A second pair of arms 52 and 54 have their first ends rotatably supported about the shaft 50 and extend rearwardly to a location generally below the trunnion 32 where these arms are secured to a ground-engaging bumper 55. For additional strength the arms are interconnected by cross-braces 56. Hereinafter the arms 52, 54 the braces 56 and the bumper 55 sometimes will be referred to as the frame 57.

A pair of double-acting hydraulic jacks 58 and 60 have their piston rods 62 and 64 pivotably secured to ears 66 and 68 of the bumper 54 and their cylinder ends 63 and 65 pivotably secured respectively about the shafts 42 and 44. As seen best in FIGURE 5, an expansion of the cylinders will lower frame 57 into ground engagement and a contraction of the jacks will draw the frame toward the bed.

In order to provide a more efficient loading capability for the bed 14, approach plate assembly 90 can be provided on the end of the bed 14. As shown in FIGURES 7 and 8, the approach plate assembly 90 is mounted on the rearmost portion of the truck bed 14. The approach plate assembly is hydraulically adjustable and comprises an approach plate 92, a hydraulic jack 94 and a cam plate 96. The plate 92 is pivotally connected to the bed 14 by means of a pivot bar 98 and represents a rearward pivotal extension of the entire transverse width of the bed. The underside of the plate 92 is provided with an inclined bearing surface 100 which terminates in a flat bearing surface 102.

The jack 94 is provided with a piston rod 104 which has the cam 96 rigidly mounted on its extreme end. The jack is secured to and carried by the bed 14 and the cam 96 has an inclined surface 106 and a flat surface 108 for cooperating sliding engagement with the plate surfaces 100 and 102. As shown in the drawings, the jack 94 operates to extend and retract the rod 104 along a line parallel to the longitudinal axis of the bed 14. When the rod is in its retracted position, surfaces 108 and 102 will be in engagement and the top surface of the approach plate 92 will be coplanar with the bed 14. When the plate 92 is extended, the surfaces 108 and 102 will go out of engagement causing the inclined surfaces 106 and 100 to come into engagement, thereby pivoting the approach plate downwardly toward the ground.

The hydraulic approach plate assembly thus provides a convenient and efficient adjustable assembly for assisting in the loading of the tilting bed 14. By the use of the flat and inclined opposed surfaces 100, 102, 106 and 108 it can be seen that the approach plate 92 is always solidly supported no matter what its selected position.

The sequence of operation for the vehicle is shown by reference to FIGURES 1–4. The vehicle operator approaches the loading area with bed 14 forward (to left) and assembly 30 in its upper nested position. In order to convert the bed 14 into a loading ramp, the operator expands the jacks 58 and 60 until the bumper bar 55 engages the ground. The jack 23 is then expanded until the end of the bed 14 is over the area from which it is desired to load the bed.

At this time the front of the bed has unlocked itself from locking device 16. The jacks 58 and 60 are then contracted until the end 60 engages the loading area. It can be seen that a minimum loading angle is obtained by a maximum extension of the jack 23. If, for terrain purposes or if for other reasons, a sharper loading angle is warranted, the jack 23 need not be fully extended but the jacks 58 and 60 will have the capability of tilting the bed 14 into ground engagemnet. It can also be understood that if the ground surface 62 at the loading area is at a higher or lower elevation than the elevation of vehicle wheels, the jacks 58 and 60 can bring the bar " into and out of engagement with the ground merely by controlling the extent of their expansion and contraction.

The hydraulic circuitry for powering the cylinders is conventional in design and safety. Conventional hydraulic bypass valves are associated with the cylinders 58 and 60 so that when the applied load exceeds the rate of capacity of the vehicle the load will not be permitted to be lifted onto the vehicle frame. With reference to the above description, it will also be recognized that the loading bed can be used with dock loading arrangements of various heights.

As is conventional in vehicle of this type, after the load has been distributed on bed 14, the jacks 58 and 60 are expanded to their FIGURE 3 position until the bed is horizontally aligned with the top of the chassis. At this time the cylinder 23 is contracted to force the bed into its forward travel position. After the bed is secured to the frame 12 by the locking means 16 the jacking assembly can be contracted into its nested position as shown in FIGURE 1.

It can be seen, therefore, that the invention allows a tilting vehicle bed to be adjusted to the contour of the supporting surface. On an uneven surface the supporting cylinder jacks can be extended until solid support is reached by each cylinder. The flexing of the jack assembly 30 is transferred to the truck springs rather than through the chassis frame members.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

We claim:
1. A vehicle of the type having a main chassis carried by a wheel-supported suspension system and a load-carrying bed on said chassis wherein the improvement comprises
   first means slidably mounting said bed with respect to said chassis,
   second means for sliding said bed from a front position where a first length of bed overhangs the endmost portion of said chassis to a rear position where a greater length of said bed overhangs the endmost portion of said chassis,
   an assembly at the rear of the chassis having an upper end slidably engaged with said bed and a lower ground engaging end, and
   expansion jack means connecting said upper end and said lower end for tilting said bed with respect to said chassis when said bed is in said rear position.

2. The invention of claim 1 wherein said expansion means is comprised of at least one double acting hydraulic jack.

3. The invention of claim 1 wherein a locking device secures the forward end of said bed to said chassis when said bed is in said forward position.

4. The invention of claim 1 wherein a first framework connects said upper end to the endmost portion of said chassis.

5. The invention of claim 4 wherein a second framework has one end pivotally connected to said endmost portion and its other end connected to said lower end.

6. The invention of claim 1 wherein said expansion jack means comprise a first hydraulic jack having an upper end in sliding engagement with said bed, a second hydraulic jack generally parallel to said first jack and having its upper end in sliding engagement with said bed, said first and second jacks respectively having first and second lower ends, a framework connecting said lower ends and sufficiently flexible to permit said hydraulic jacks to expand and contract with respect to each other.

7. The invention of claim 1 wherein stabilizing means fix the distance between the position of said first means with respect to said chassis.

8. The invention of claim 1 wherein said stabilizing means is a framework between said chassis and said first means.

9. The invention of claim 1 wherein the endmost portion of said bed includes adjustable approach plate means for providing an access ramp between the ground and said bed.

10. The invention of claim 9 wherein said adjustable approach plate means comprises a plate having one end secured for pivotal movement about the transverse end of said bed, cam means secured to said bed for movement along the longitudinal axis of said bed, said plate having its other end supported by said cam means so that longitudinal movement of said cam means causes pivotal movement of said plate.

11. A vehicle of a type having an elongated main chassis, an elongated bed slidably extensible on said chassis with a portion of said bed overhanging one end of said chassis in said extensible position and said bed tiltably mounted to said one end wherein the improvement is in a jacking assembly for lifting said bed from its tilted position comprising at least one hydraulic expansion jack, means pivotally securing an upper end of said jack to said portion and said jack having a lower ground engaging end, and a framework having a first end pivotally secured to the rear of said chassis and a second end pivotally secured to said ground engaging ends.

12. The invention of claim 11 wherein said means slidably engages said bed and second framework connected to said chassis and said means fixedly determines the lineal distance between said chassis and said means.

13. The vehicle of claim 1 wherein said bed is tiltable about an axis of said first means transverse to the length of said chassis, said second means is a fluid expansion motor having one end connected to said bed and its other end connected to said chassis and mounting means pivotally secures said motor to said bed about said axis.

14. In a vehicle having a main frame and a bed for sliding and tilting about a point rearwardly of the vehicle rear axle, a support assembly comprising:
first and second legs having their first ends pivotally connected to said frame and extending rearwardly of said frame,
said first leg having a second end in sliding engagement with said bed,
said second leg having a ground-engaging end,
an expansion jack, means pivotally connecting one end of said jack to said second end of said first leg and the other end of said jack to said ground-engaging end of said second leg.

References Cited

UNITED STATES PATENTS

| | | | |
|---|---|---|---|
| 2,621,814 | 12/1952 | Lisota | 214—505 |
| 3,375,946 | 4/1968 | Drake | 214—505 |

ALBERT J. MAKAY, *Primary Examiner.*

U.S. Cl. X.R.

298—14